(12) United States Patent
Yonei et al.

(10) Patent No.: US 7,460,334 B2
(45) Date of Patent: Dec. 2, 2008

(54) SPINDLE MOTOR AND RECORDING-DISK DRIVE FURNISHED WITH THE SPINDLE MOTOR

(75) Inventors: Hiroyuki Yonei, Kyoto (JP); Kunihiko Hashimoto, Kyotanabe (JP)

(73) Assignee: Nidec Corporation, Kyoto (JP)

( * ) Notice: Subject to any disclaimer, the term of this patent is extended or adjusted under 35 U.S.C. 154(b) by 324 days.

(21) Appl. No.: 11/160,029

(22) Filed: Jun. 6, 2005

(65) Prior Publication Data

US 2005/0286167 A1    Dec. 29, 2005

(30) Foreign Application Priority Data

Jun. 23, 2004   (JP)   ............... 2004-185654
Feb. 7, 2005    (JP)   ............... 2005-030698

(51) Int. Cl.
*G11B 19/20* (2006.01)
*G11B 33/14* (2006.01)
*H02K 7/08* (2006.01)

(52) U.S. Cl. ............... 360/99.08; 360/97.02; 310/67 R

(58) Field of Classification Search ............... 360/97.02, 360/97.03, 99.08, 98.07, 98.08, 99.12; 310/67 R, 310/90

See application file for complete search history.

(56) References Cited

U.S. PATENT DOCUMENTS

| 4,623,944 | A | * | 11/1986 | Yamashita | ............... | 360/84 |
| 4,701,653 | A | * | 10/1987 | Merkle et al. | ............... | 310/152 |
| 4,902,941 | A | * | 2/1990 | Merkle et al. | ............... | 310/216 |
| 5,251,081 | A | * | 10/1993 | Cossette et al. | ............... | 360/97.02 |
| 5,844,748 | A | * | 12/1998 | Dunfield et al. | ............... | 360/99.08 |
| 5,965,966 | A | * | 10/1999 | Aiello et al. | ............... | 310/232 |
| 6,219,199 | B1 | * | 4/2001 | Sakuragi et al. | ............... | 360/99.08 |
| 6,512,654 | B2 | | 1/2003 | Teshima | | |
| 6,600,632 | B1 | * | 7/2003 | Prochazka et al. | ............... | 360/264.1 |
| 6,844,642 | B2 | * | 1/2005 | Tashiro | ............... | 310/90 |
| 6,940,193 | B2 | * | 9/2005 | Hoffmann et al. | ............... | 310/67 R |
| 2004/0108780 | A1 | * | 6/2004 | Hoffmann et al. | ............... | 310/90 |

FOREIGN PATENT DOCUMENTS

| JP | 05-242589 | | 9/1993 |
| JP | H07-253165 A | | 10/1995 |
| JP | 10083621 A | * | 3/1998 |

(Continued)

OTHER PUBLICATIONS

"Foil Spindle Ground," Nov. 1993, IBM Technical Disclosure Bulletin, vol. 36, Iss. No. 11, pp. 83-84.*

*Primary Examiner*—William J Klimowicz
(74) *Attorney, Agent, or Firm*—Volentine & Whitt, PLLC

(57) ABSTRACT

Spindle motors, one example being furnished with: a housing member perforated by a round through-hole; a sleeve disposed within the housing through-hole; a shaft; fluid dynamic-pressure bearings that support the shaft against the sleeve letting one rotate relative to the other; and an electroconductive member contacting on the housing member and the sleeve, and electrically interconnecting the two. An elastic limb that in its elastically deformed state contacts on at least either the housing member or the sleeve is formed on at least either the inner periphery or the outer periphery of the electroconductive member. By the spring force of the elastic limb, the electroconductive member contacts on the housing member and the sleeve, maintaining elastic stress between them.

16 Claims, 11 Drawing Sheets

FOREIGN PATENT DOCUMENTS

| | | |
|---|---|---|
| JP | 11-053826 | 2/1999 |
| JP | 2001-032827 A | 2/2001 |
| JP | 2001-231214 | 8/2001 |
| JP | 2002-044900 | 2/2002 |
| JP | 3302543 B2 | 4/2002 |
| JP | 2003162890 A * | 6/2003 |
| JP | 2003-314534 | 11/2003 |
| JP | 2005143227 A * | 6/2005 |

* cited by examiner

SPINDLE MOTOR AND RECORDING-DISK DRIVE FURNISHED WITH THE SPINDLE MOTOR

BACKGROUND OF THE INVENTION

1. Technical Field

The present invention relates to spindle motors and to disk drives furnished with the spindle motors.

2. Description of the Related Art

Spindle motors for rotatively driving recording disks such as magnetic disks chiefly comprise a rotor assembly that includes a shaft, and a stator assembly in which a sleeve is anchored. The shaft is disposed along the inner periphery of the sleeve, and a rotor hub that carries a recording disk(s) is fixed to the upper-end portion of the shaft. The sleeve is anchored by means such as an adhesive to a retaining device, typically a bracket portion, and via fluid-dynamic-pressure bearings rotatively supports the shaft.

Recording-disk drives employing spindle motors are furnished with magnetic heads for reading data from or writing data onto the recording disk(s).

A problem with the above-described spindle motors employed in recording-disk drives is static electricity. When a spindle motor is driven, spinning the recording disk(s) at high speed, friction between the disks and the enveloping air is produced, and due to the resulting static electricity the disks take on an electric charge. The disks taking on a charge ends up producing an electric-potential difference between the disks and the bracket portion. As a consequence the potential difference is applied across the disks and the magnetic heads, producing electrical discharge between the disks and the heads that could destroy the heads.

This risk is particularly pronounced with magnetoresistive (MR) heads as well giant magnetoresistive (GMR) heads, which due to a transition to large volume, high-density recording disks in recent years are being adopted as the magnetic heads in recording-disk drives. Because MR and GMR heads structurally include circuit elements having high electric-current densities, and because such heads are composed from thin films, not furnishing them with some sort of protective structure against electric potential differences puts the heads at risk of being damaged.

To guard against such problems, a configuration that establishes electrical continuity between motor components such as the rotor assembly and the stator assembly, electrically connecting the two, is necessary. To date the following mechanisms have been proposed for establishing such a continuity configuration.

For example, in a spindle-motor structure in which the rotor assembly is retained in the stator assembly via a fluid-dynamic-pressure bearing unit, continuity between the rotor and stator assemblies can be designed into the configuration by lending electroconductivity to the lubricating fluid. In another example, an electroconductive adhesive agent is used as the adhesive means for anchoring a sleeve and bracket portion forming a stator assembly, thus serving as a way to equalize the electric potentials of the sleeve and the bracket portion. And a spindle motor can be designed for electrical continuity between the sleeve and the bracket portion by plastically deforming a portion of the area of adherence between the sleeve and the bracket portion to conjoin them metallically.

Traditionally, it has usually been the case that the sleeve and the bracket portion are each formed from a different type of material. The thermal expansion coefficients of the sleeve and the bracket portion are therefore often different. Moreover, in implementations employing an electroconductive adhesive to anchor the sleeve and bracket portion, the thermal expansion coefficient of the adhesive is often different from that of the sleeve as well as that of the bracket portion.

When the rotor assembly of a spindle motor in such an implementation spins, vibrations and similar disturbances due to the rotation of the rotor assembly are transmitted to the sleeve via the fluid-dynamic-pressure bearing, and further are exerted on the electroconductive adhesive. Consequently, if it should happen that a sufficient amount of the electroconductive adhesive has not been applied between the sleeve and the bracket portion, there will be a danger that fissures and breaks in, and peeling off of, the adhesive due to vibrational and like disturbances will occur; such occurrences arising in the electroconductive adhesive impair the continuity between the sleeve and the bracket portion.

Meanwhile, because silver is the chief component in the majority of electroconductive adhesives, they are costly. Consequently, in most cases the amount of electroconductive adhesive used is made as slight as possible, which serves to curtail the expense; yet the continuity between the sleeve and the bracket portion will be impaired if there is too little electroconductive adhesive between them.

BRIEF SUMMARY OF THE INVENTION

An object of the present invention is to enable the bearing assembly and bracket portion to be securely anchored, and to assure reliable continuity between them, in a spindle motor, as well as a recording-disk drive equipped with the spindle motor.

Another object of the invention is to afford a spindle motor, as well as a recording-disk drive equipped with the spindle motor, manufacturable at low cost.

In order to achieve the foregoing objectives, a spindle motor in one example of the present invention is furnished with: a housing member; a bearing assembly disposed within a round housing through-hole in the housing member; and an electroconductive member contacting on the housing member and the bearing assembly, and electrically interconnecting the two.

An elastic part that in its elastically deformed state contacts on at least either the housing member or the bearing assembly is formed on at least either the inner periphery or the outer periphery of the electroconductive member, and by the spring force of the elastic part, the electroconductive member contacts on the housing member and the bearing assembly, maintaining elastic stress between them.

With the electroconductive member having been fit by insertion in between the housing member and the bearing assembly, initially spring force acting on the electroconductive is not produced. Subsequently, by the elastic part of the electroconductive member being brought into contact in the elastically deformed state with at least either the housing member or the bearing assembly, the electroconductive member becomes engaged firmly between the housing member and the bearing assembly by means of the spring force of the elastic part. The result is that via the electroconductive member, the housing member and the bearing assembly can be put into an electrically connected state.

From the following detailed description in conjunction with the accompanying drawings, the foregoing and other objects, features, aspects and advantages of the present invention will become readily apparent to those skilled in the art.

DETAILED DESCRIPTION OF THE INVENTION

Below, a spindle motor involving single embodiments of the present invention, and a recording-disk drive equipped with the spindle motor, will be explained with reference to FIGS. 1 through 11. It should be understood that in describing embodiments of the present invention, the up/down orientation of the drawings is for convenience rendered "up/down," but does limit the orientation in an actual installation.

Embodiment 1

Spindle Motor Structure

Figure 1:
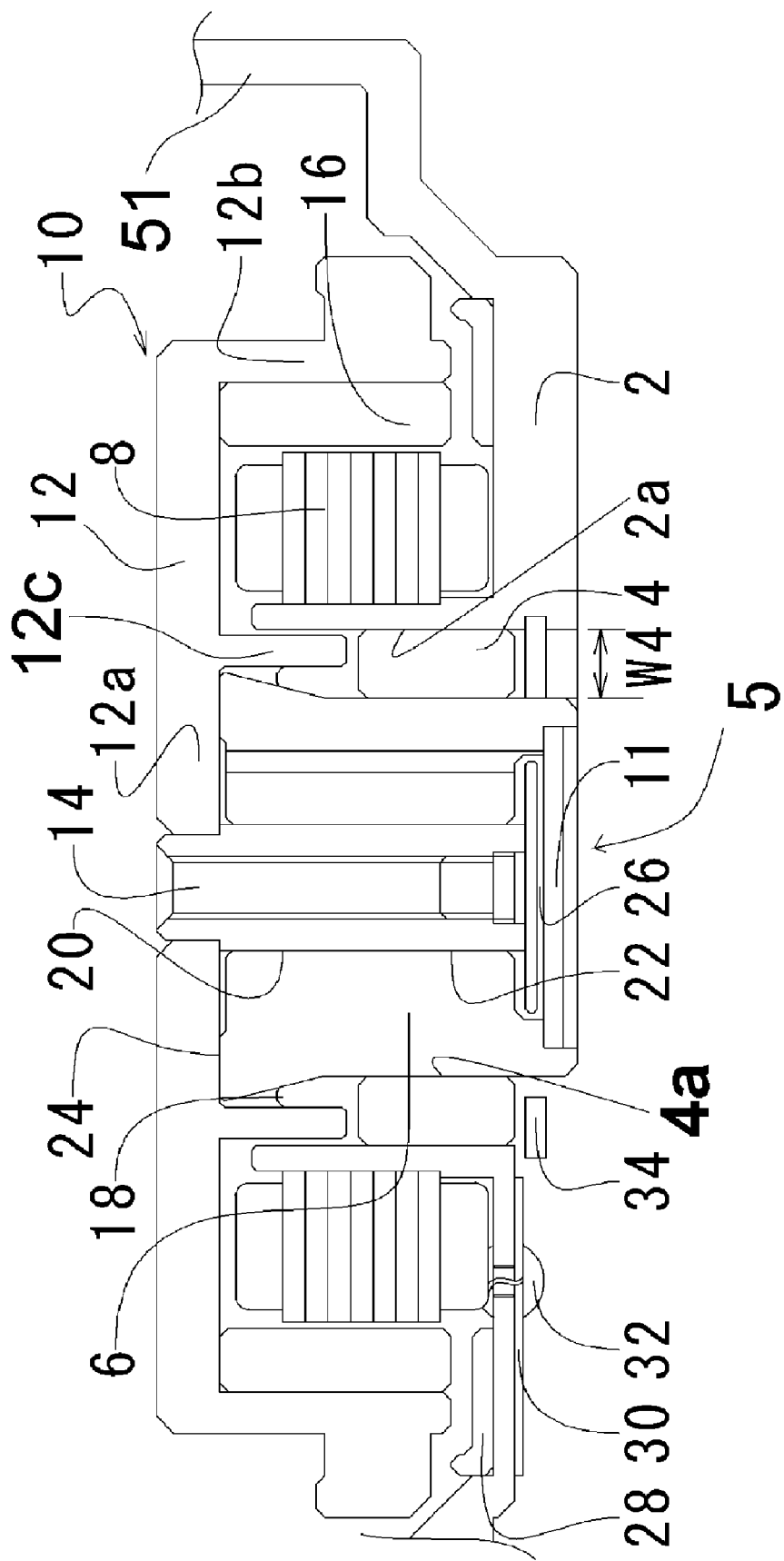
FIG. 1 is a vertical sectional view illustrating a spindle motor in Embodiment 1 of the present invention.

With reference to FIG. 1, an explanation of Embodiment 1 of the present invention will be made. FIG. 1 is a vertical sectional view illustrating a spindle motor that is employed in, for example, a hard-disk drive.

The spindle motor is furnished with a roughly cup-shaped first housing member 51, and a bushing 4 and a sleeve 6 that are anchored into a housing round through-hole 2a in the midportion of the first housing member 51. Hereinafter, the bottom platelike portion of the first housing member 51 will be referred to as a bracket portion 2. The bushing 4 has a round bushing through-hole 4a axially perforating it through the central portion, and is fixed in between the sleeve 6 and the bracket portion 2 in order to cushion the bracket portion 2 against vibrations from the sleeve 6.

The sleeve 6 is a component fashioned in hollow cylindrical form. The lower end portion of the sleeve 6 is closed over by a sealing member 11, the inner circumferential surface of the sleeve 6 radially opposes a rotor assembly 10 across a micro-gap, and the top-edge surface of the sleeve 6 axially (corresponding to the up/down orientation of FIG. 1) opposes the undersurface of the rotor assembly 10 across a micro-gap.

It will be appreciated that although in the present embodiment the bracket portion 2 is formed integrally with the first housing member 51 (also represented in FIG. 11) for a recording-disk drive of the present invention, it is not limited to this configuration, in that the bracket portion 2 and the first housing member 51 may be each be formed as a separate component.

The rotor assembly 10 comprises a rotor hub 12 and a shaft 14 fixedly fitted into the rotor hub 12. The rotor hub 12 is provided with an approximately discoid top-wall portion 12a, and a circumferential wall portion depending from the circumferential periphery of the top-wall portion 12a.

A rotor magnet 16 is affixed by means of an adhesive to the inner circumferential surface of the circumferential wall portion 12b, and therein the rotor magnet 16 radially opposes a stator 8 across a micro-gap. Also, disks (reference mark 53 in FIG. 11) are arranged along the outer circumferential surface of the circumferential wall portion 12b.

In the structure set out above, the gap between the undersurface of the top-wall portion 12a of the rotor hub 12 and the top-edge surface of the sleeve 6, the gap between the inner circumferential surface of the sleeve 6 and the outer circumferential surface of the shaft 14, and a gap between the lower end face of the shaft 14 and the top surface of the sealing member 11 are all continuous. Then oil as a lubricating fluid is retained uninterrupted in the connected series of gaps.

The upper portion of the sleeve 6 along the outer circumferential surface diametrically constricts into a sloped surface heading axially downward from the top-edge surface of the sleeve 6. In radial dimension, the gap between this sloped surface and, opposing it, an orbicular projection 12c from the top-wall portion 12a of the rotor hub 12 grows larger as it heads axially downward (toward the bracket portion 2). In effect, the outer circumferential surface of the sleeve 6 upper portion, and the orbicular projection 12c from the top-wall portion 12a of the rotor hub 12 interact to constitute a capillary seal 18. In the oil retained within the gaps described above, the surface tension of the oil and the external air pressure balance in this capillary seal 18, forming the interface between the oil and the air into a meniscus.

Fluid Dynamic-Pressure Bearings

The spindle motor of Embodiment 1 spins on a bearing assembly 5 comprising the sleeve 6, the sealing member 11 closing over the axially lower end portion of the sleeve 6, and the shaft 14, which rotates on the motor central axis, wherein the outer circumferential surface of the shaft 14 faces the inner circumferential surface of the sleeve 6 with the micro-gap interposed therebetween.

In the radial gap in between the inner circumferential surface of the sleeve 6 and the outer circumferential surface of the shaft 14, an upper radial dynamic-pressure bearing 20 and a lower dynamic-pressure bearing 22 are provided, separated axially. The upper radial dynamic-pressure bearing 20 and lower dynamic-pressure bearing 22 are constituted from the inner circumferential surface of the sleeve 6, the outer circumferential surface of the shaft 14, and oil retained in the radial gap where the two components radially oppose each other.

Figure 2A:
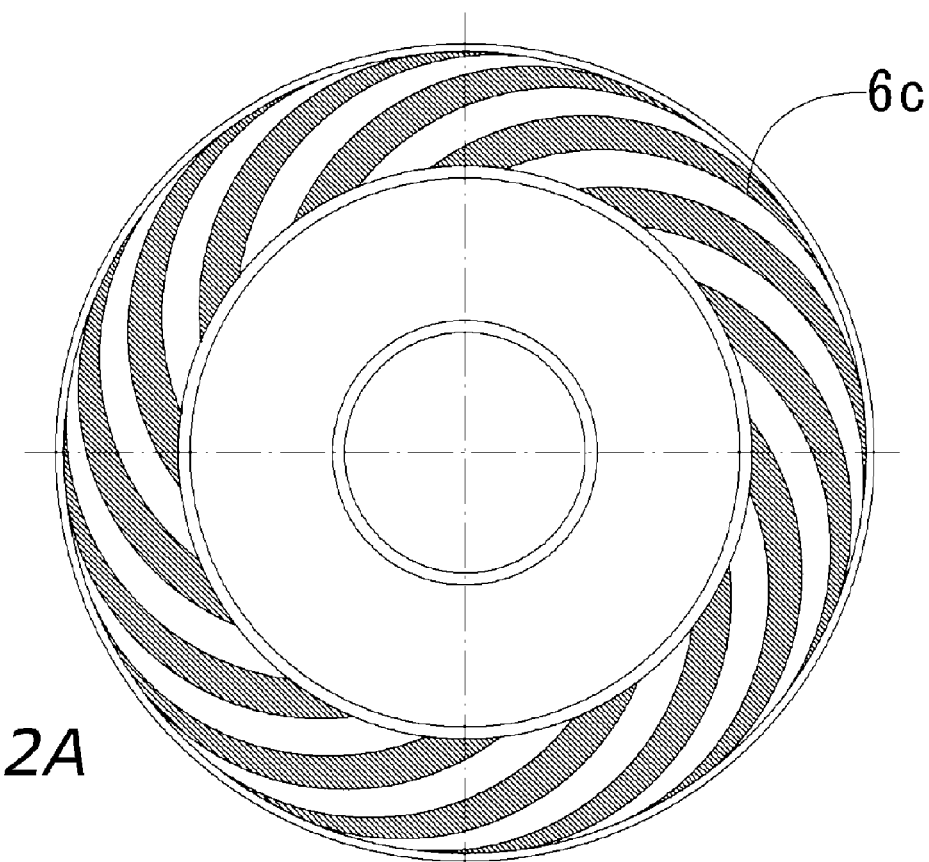
FIG. 2A is an overhead view of the sleeve in FIG. 1.
Figure 2B:
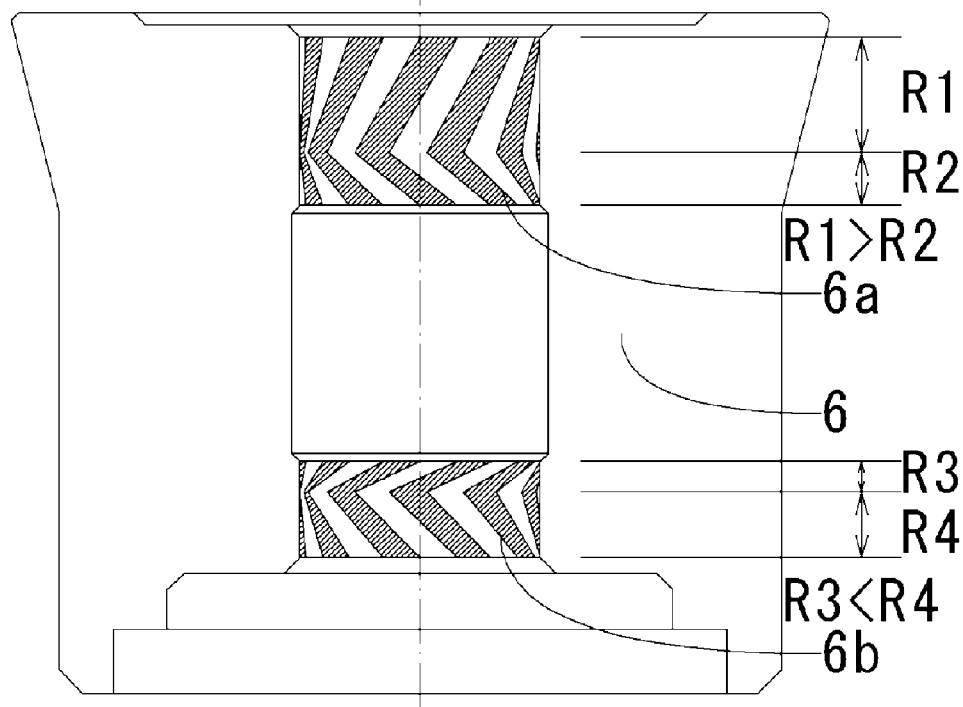
FIG. 2B is a vertical sectional view of the sleeve in FIG. 1.

As depicted in FIG. 2B, in the region in which the upper radial dynamic-pressure bearing 20 is constituted, herringbone grooves 6a that lead oil from both axial ends towards the approximate midportion of the upper radial dynamic-pressure bearing 20, and that have an axially unbalanced geometry ($R_1 > R_2$) are formed. In this configuration, a shifting pressure in which the oil heads axially downward (towards the lower radial dynamic-pressure bearing 22) is thus brought about when the rotor assembly 10 spins. In other words, while the oil is led towards the midportion of the upper radial dynamic-pressure bearing 20, because the herringbone grooves 6a form an axially unbalanced geometry, the oil develops maximum pressure just downward from the midportion of the upper radial dynamic-pressure bearing 20, supporting the rotor assembly 10 and, in proportion to that unbalance, urging the oil to flow axially downward.

In turn, in the region in which the lower radial dynamic-pressure bearing 22 on the inner circumferential surface of the sleeve 6 is constituted, herringbone grooves 6b that lead oil from both axial ends towards the approximate midportion of the lower radial dynamic-pressure bearing 22, and that have an axially unbalanced geometry ($R_3<R_4$) are formed. In this configuration, a shifting pressure in which the oil heads axially upward (towards the upper radial dynamic-pressure bearing 20) is thus brought about when the rotor assembly 10 spins. That is, while the oil is led towards the midportion of the lower radial dynamic-pressure bearing 22, because the herringbone grooves 6b form an axially unbalanced geometry, the oil develops maximum pressure just upward from the midportion of the lower radial dynamic-pressure bearing 22, supporting the rotor assembly 10 and, in proportion to that unbalance, urging the oil to flow axially upward.

Turning now to the motor's axially directed bearing configuration, in a micro-gap across which the top-edge face of the sleeve 6, and the undersurface of the top-wall portion 12a of the rotor hub 12 axially oppose each other, a thrust dynamic-pressure bearing 24 is provided. The thrust dynamic-pressure bearing 24 is constituted from the top-edge face of the sleeve 6, the undersurface of the top-wall portion 12a of the rotor hub 12, and oil retained in the gap where the two components radially oppose each other.

As depicted in FIG. 2A, spiral grooves 6c are formed in the top-edge surface of the sleeve 6 so that oil is led radially inward (towards the outer circumferential surface of the shaft 14 upper portion). When the rotor assembly 10 spins, radially inward-heading pressure is induced in the thrust dynamic-pressure bearing 24 by the spiral grooves 6c. This pressure heightens the oil internal pressure, generating fluid dynamic pressure acting in the direction in which the rotor assembly 10 is lifted, and keeps at a positive pressure level the pressure of the entire oil retained in the gap between the inner circumferential surface of the sleeve 6 and the outer circumferential surface of the shaft 14, and in the gap between the bottom-edge surface of the shaft 14 and the top surface of the sealing member 11.

It should be noted that the pressure generated in the thrust dynamic-pressure bearing 24 is at a level that somewhat exceeds atmospheric pressure, which consequently is prohibitive of sufficient lift being put on the rotor hub 12 with the thrust dynamic-pressure bearing 24 alone. Nevertheless, since the oil retained in the series of bearing gaps is without being interrupted entirely continuous, the internal pressure of the oil retained in the motor-bottom gap between the bottom-edge surface of the shaft 14 and the top surface of the sealing member 11 goes to a pressure level equal to that of the oil internal pressure heightened by the fluid dynamic pressure induced in the thrust dynamic-pressure bearing 24. The oil in the motor-bottom gap thus functions as a static-pressure bearing 26, and accordingly the interaction of the thrust dynamic-pressure bearing 24 and the static-pressure bearing 26 enables the rotor assembly 10 to be sufficiently lifted.

A further aspect of the axial bearing configuration is that, located on the bracket portion 2 and in an area axially opposing the rotor magnet 16, an annular thrust yoke 28 formed from a ferromagnetic material is provided. Force of magnetic attraction between the rotor magnet 16 and the thrust yoke 28 is thereby generated. When the rotor assembly 10 is rotating, the rotor assembly 10 is held steady and supported in a position in which the magnetic force as just described, and the lifting force on the rotor hub 12, produced by the thrust dynamic-pressure bearing 24 and the static-pressure bearing 26, balance. It will be appreciated that it is also possible to cause such magnetic biasing force to act on the rotor assembly 10 by, for example, setting up an axial disparity between the magnetic centers of the stator 8 and the rotor magnet 16.

As to other configurational alternatives, the dynamic-pressure-generating grooves of the upper and lower radial dynamic-pressure bearings 20 and 22 are not limited to the geometries described earlier; various modifications of the groove configurations are possible. For example, the herringbone grooves of the upper radial dynamic-pressure bearing 20 may be formed as axially unbalanced striations so that when the motor is spinning the oil develops maximum pressure just downward from the midportion of the upper radial dynamic-pressure bearing 20, and the herringbone striations as the lower radial dynamic-pressure-generating grooves may be formed in a geometry of axially symmetrical striations so that when the motor is running the oil develops maximum pressure in the approximate midportion of the lower radial dynamic-pressure bearing 22.

Another alternative is to form the herringbone grooves of the upper radial dynamic-pressure bearing 20 in a geometry of axially symmetrical striations so that the oil develops maximum pressure in the approximate midportion of the upper radial dynamic-pressure bearing 20, and to form the herringbone grooves of the lower radial dynamic-pressure bearing 22 in a geometry of axially unbalanced striations so that the oil develops maximum pressure just downward from the midportion of the lower radial dynamic-pressure bearing 22.

A further option in configuring the groove geometry is in the upper and lower radial dynamic-pressure bearings 20 and 22 to form axially extending vertical striations as the dynamic-pressure-generating grooves. And yet another option is in the thrust dynamic-pressure bearing 24 to form herringbone grooves as the dynamic-pressure-generating grooves instead of the spiral grooves 6c.

Electroconductive Component

Figure 3:
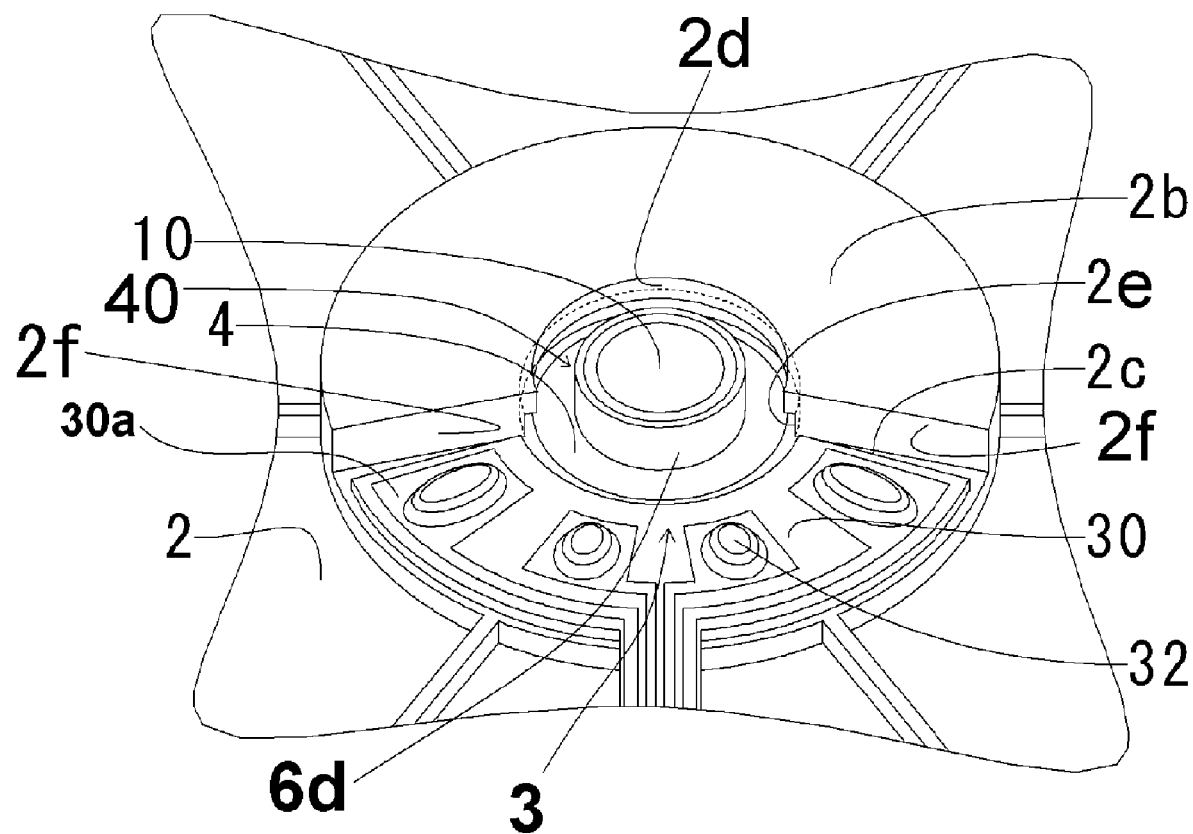
FIG. 3 is an enlarged view of a portion, shown inverted, of the underside of the spindle motor in FIG. 1.

Reference is made to FIG. 3, which is an enlarged view of a portion, shown inverted, of the underside of the spindle motor in FIG. 1; thus up and down in FIG. 3 are the opposite of the directions in FIG. 1. As illustrated in FIG. 3, in the lower part of the bracket portion 2, a platform portion 2b is formed integrally with the bracket portion 2. Therein, a gap 40 is defined by the inner-edge surface 2d of the platform portion 2b, a sleeve-projection outer circumferential surface 6d (constituting a bearing-assembly-projection outer circumferential surface) of the sleeve 6, and the lower-edge surface (in FIG. 3, the upper-edge surface) of the bushing 4. A radially expanding notch 3 where a portion of the platform portion 2b is cut out is formed on the bottom portion (upper portion in FIG. 3) of the bracket portion 2. The radially expanding notch 3 defines a flat face 2c approximately parallel with the lower-edge surface of the bushing 4, and end faces 2f of the platform portion 2b. A circularly arcuate groove 2e is recessed extending radially outward into the inner-edge surface 2d of the platform portion 2b. The arcuate groove 2e opens onto the gap 40 and the end faces 2f of the platform portion 2b.

A flexible printed circuit board (referred to as an FPC hereinafter) 30 that connects leads from the stator 8 with (not illustrated) external electrodes is affixed by adhesive or like means to the flat face 2c. The ends of the stator 8 coil windings (four in the present embodiment) are soldered to lands in the FPC 30. Power-source electric current is thereby applied from the external electrodes via the FPC 30 to the stator 8, producing a rotating magnetic field that drives the spindle motor.

The soldering work is done on the flat face 2c to prevent, as indicated in FIG. 1, the solder nubs 32 from sticking out axially downward beyond the axially lower edge surface (upper edge surface in FIG. 3) of the platform portion 2b.

Accordingly, the solder nubs 32 are prevented from coming into contact with and damaging structural features disposed in the motor environs.

Figure 4:
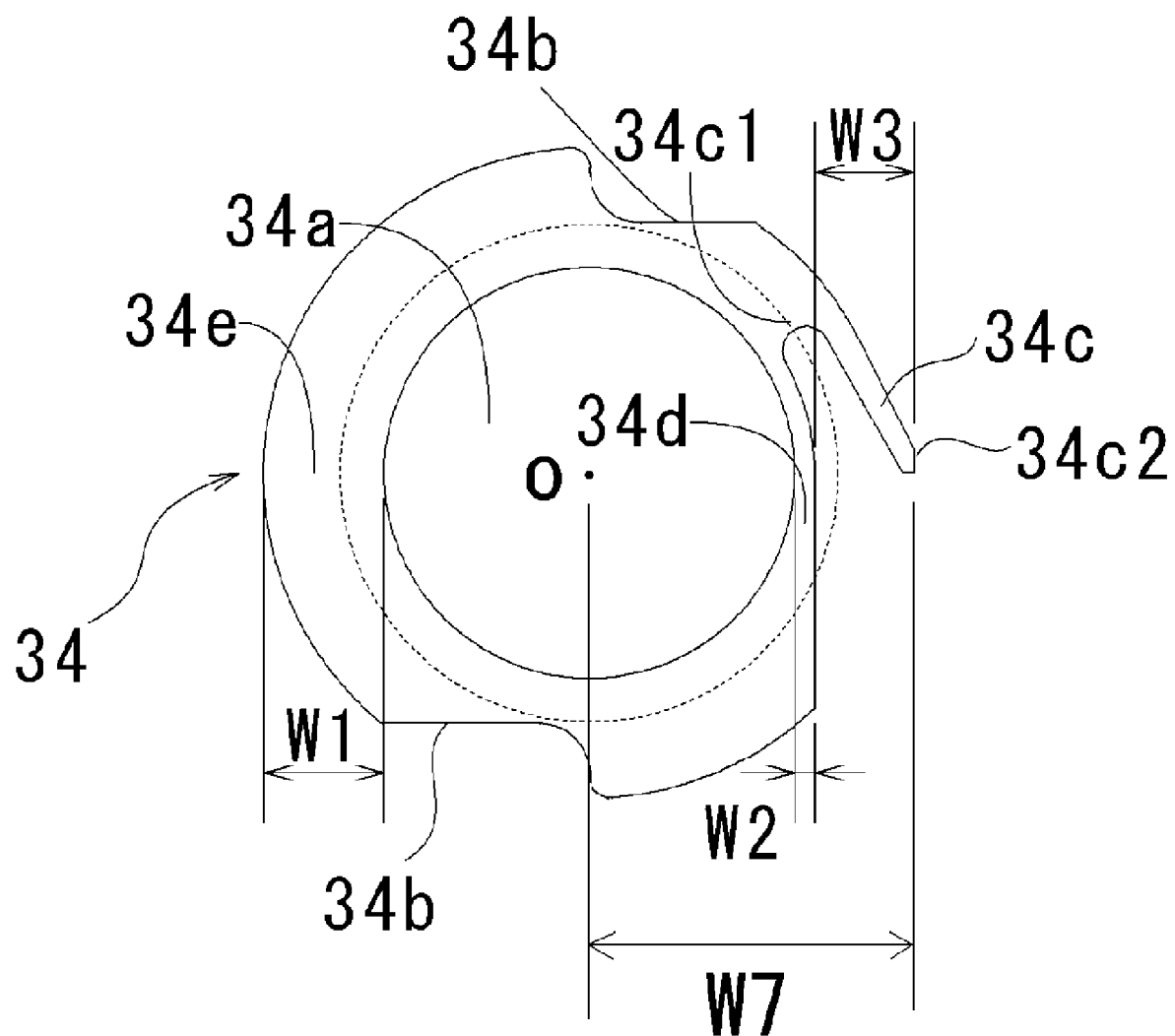
FIG. 4 is an overhead view of an electroconductive member in FIG. 1.

An electroconductive component 34 for securing electrical continuity between the sleeve 6 and the bracket portion 2 is arranged in the gap 40. The electroconductive component 34 is an annular member as illustrated in FIG. 4, wrought by press forming for example a metal such as stainless steel (JIS-grade SUS 304, SUS 303, SUS 420, SUS 430, etc.), phosphor bronze, or beryllium copper. The electroconductive component 34 is configured with: a hole 34a through the center portion; holds 34b, cut out from the outer circumferential surface to an inner circumferential surface of the electroconductive component 34; an elastic limb 34c (corresponding to an elastic part) jutting out from the outer circumferential surface of the electroconductive component 34; and a thin-width portion 34d that radially opposes the elastic limb 34c.

The elastic limb 34c is of a form in which its width dimension gradually tapers as it extends to a radially outer nib 34c2 in the tip, and in which its separation W7 from the electroconductive component 34 center O in FIG. 4 grows wider heading in the rotational direction toward the nib 34c2. The electroconductive component 34 is formed so that the width dimension W3 from the radially outer nib 34c2 in the tip of the elastic limb 34c to an inner circumferential surface of the electroconductive component 34 will be longer than the radial width dimension W4, labeled in FIG. 1, from the inner-edge surface 2d of the platform portion 2b to the outer circumferential surface 6d of the projecting lower portion of the sleeve 6—that is, so that the relational formula W3>W4 holds. Furthermore, the electroconductive component 34 is configured so that the radial-width dimension W2 of the thin-width portion 34d will be shorter than the radial-width dimension W1 of the electroconductive component 34—that is, so that the relational formula W2<W1 holds. The configuration is also such that the radial-width dimension W1 of the electroconductive component 34 measures about the same as or somewhat smaller than the radial-width dimension W4 from the inner-edge surface 2d to the sleeve-projection outer circumferential surface 6d.

Electroconductive Component Functioning

Next, a method of fitting the electroconductive component 34 to the bracket portion 2 and sleeve 6 will be explained. At first, apart from the electroconductive component 34, the components that constitute the spindle motor are assembled. Next, a tool (not illustrated) is engaged in the holds 34b on the electroconductive component 34 to take hold of the electroconductive component 34. The electroconductive component 34 is then fit by insertion into the gap 40. At this point, the elastic limb 34c of the electroconductive component 34 is positioned on the edge of the circularly arcuate groove 2e where it opens on one of the end faces 2f of the platform portion 2b. Accordingly, the elastic limb 34c can be seated securely into the arcuate groove 2e by the simple, convenient method that is described below.

Figure 5:
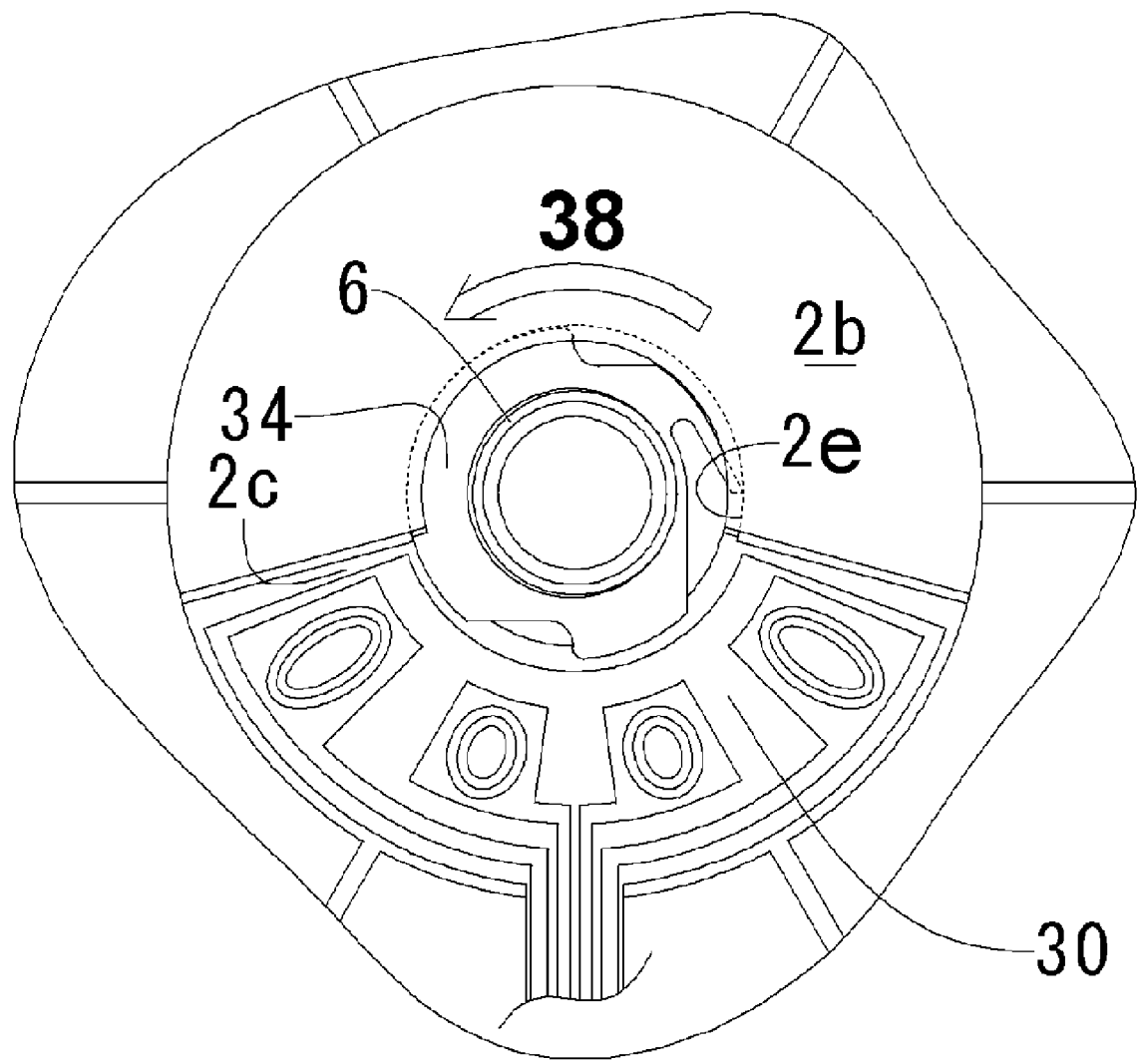
FIG. 5 is a view of the electroconductive member in the attached state.

The tool is then turned in the direction, as shown in FIG. 5, indicated by the arrow 38 (counterclockwise in the present embodiment), to inset the elastic limb 34c into the arcuate groove 2e. The elastic limb 34c is thereby elastically flexed radially inward, engaging the radially outer nib 34c2 of the elastic limb 34c in the arcuate groove 2e along its rim (not illustrated). At the same time, stress is produced by the elastic flexing of the elastic limb 34c, and the stress is transmitted from the radially outer nib 34c2 via the limb's basal portion 34c1 to its thin-width portion 34d. The stress consequently causes the entire thin-width portion 34d to become deformed radially inward, firmly locking it against the sleeve-projection outer circumferential surface 6d of the sleeve 6. Accordingly, the electroconductive component 34 firmly locks against both the sleeve 6 and the bracket portion 2.

Static electricity that is generated by the recording disk(s) when the rotor assembly 10 is spinning is transmitted from the rotor assembly 10 to the sleeve 6 via the fluid dynamic-pressure bearings formed in between the sleeve 6 and the rotor assembly 10. The static electricity is then transmitted to the electroconductive component 34 via the region in which the thin-width portion 34d of the electroconductive component 34 is locked against the sleeve-projection outer circumferential surface 6d, and is transmitted to the bracket portion 2 via the region in which the radially outer nib 34c2 of the electroconductive component 34 is locked against the internal rim of the arcuate groove 2e in the bracket portion 2. Electrical continuity between the sleeve 6 and the bracket portion 2 is favorably secured as a result, making it possible reliably to prevent the poor continuity that results from static electricity building up within the spindle motor.

Another beneficial feature is that by rendering the elastic limb 34c in a form in which its width dimension gradually tapers as the limb 34c extends from its basal portion 34c1 to the radially outer nib 34c2, the stress generated when the radially outer nib 34c2 of the electroconductive component 34 is inset into the arcuate groove 2e is prevented from being transmitted to an excess degree to the limb's basal portion 34c1.

Still another feature is that the elastic limb 34c is formed extending in the direction opposite the direction in which the electroconductive component 34 is inset within the arcuate groove 2e—that is, opposite the arrow 38. Therefore, after the electroconductive component 34 has been inset into the arcuate groove 2e, relative slipping movement between the electroconductive component 34 and the bracket portion 2 is prevented. The electroconductive component 34 is prevented, for example, from shifting in the direction opposite that of the arrow 38. Likewise, because the elastic limb 34c of the electroconductive component 34 is inset into the arcuate groove 2e, axially directed relative slipping movement between the electroconductive component 34 and the bracket portion 2 is also prevented.

Moreover, by the stress produced once the radially outer nib 34c2 of the electroconductive component 34 has been inset into the arcuate groove 2e, in addition to the thin-width portion 34d as described earlier, the entire electroconductive component 34 is shifted toward opposite the elastic limb 34c (leftward in FIG. 5). An outer peripheral portion 34e of the electroconductive component 34 where it opposes the arcuate groove 2e is consequently inset into the arcuate groove 2e. Accordingly, when external or other shock tends to shift the electroconductive component 34 axially, the electroconductive component 34 is prevented from coming out of the bracket portion 2 because the outer peripheral portion 34e of the electroconductive component 34 inset into the arcuate groove 2e locks against the internal rim of the arcuate groove 2e.

Hard-disk drives in recent years have begun being installed in vehicle on-board instruments, typified by car navigation systems. Yet with on-board instruments in vehicles, since use under a variety of environments is to be expected, stable operation within an extremely broad temperature range is being demanded of the instruments employed in these situations. Use under severe temperature environments that hard-disk drives have not met with until now—for example, use under environments where changes in temperature that range across 100° C. or more are a possibility—is being called for.

Under such temperature environments, in disk-drive implementations in which as has conventionally been the case an electroconductive adhesive is employed in between the sleeve and the bracket portion, as discussed earlier fissures and breaks in, and peeling off of, the electroconductive adhesive is liable to occur, making it likely that electrical continuity between the sleeve and the bracket portion will be impaired. In the present embodiment, in contrast, because in between the sleeve and the bracket portion the metal electroconductive component 34 is provided, the continuity between the sleeve and the bracket portion is reliably secured, even under temperature environments as just described.

Embodiment 2

Figure 6:
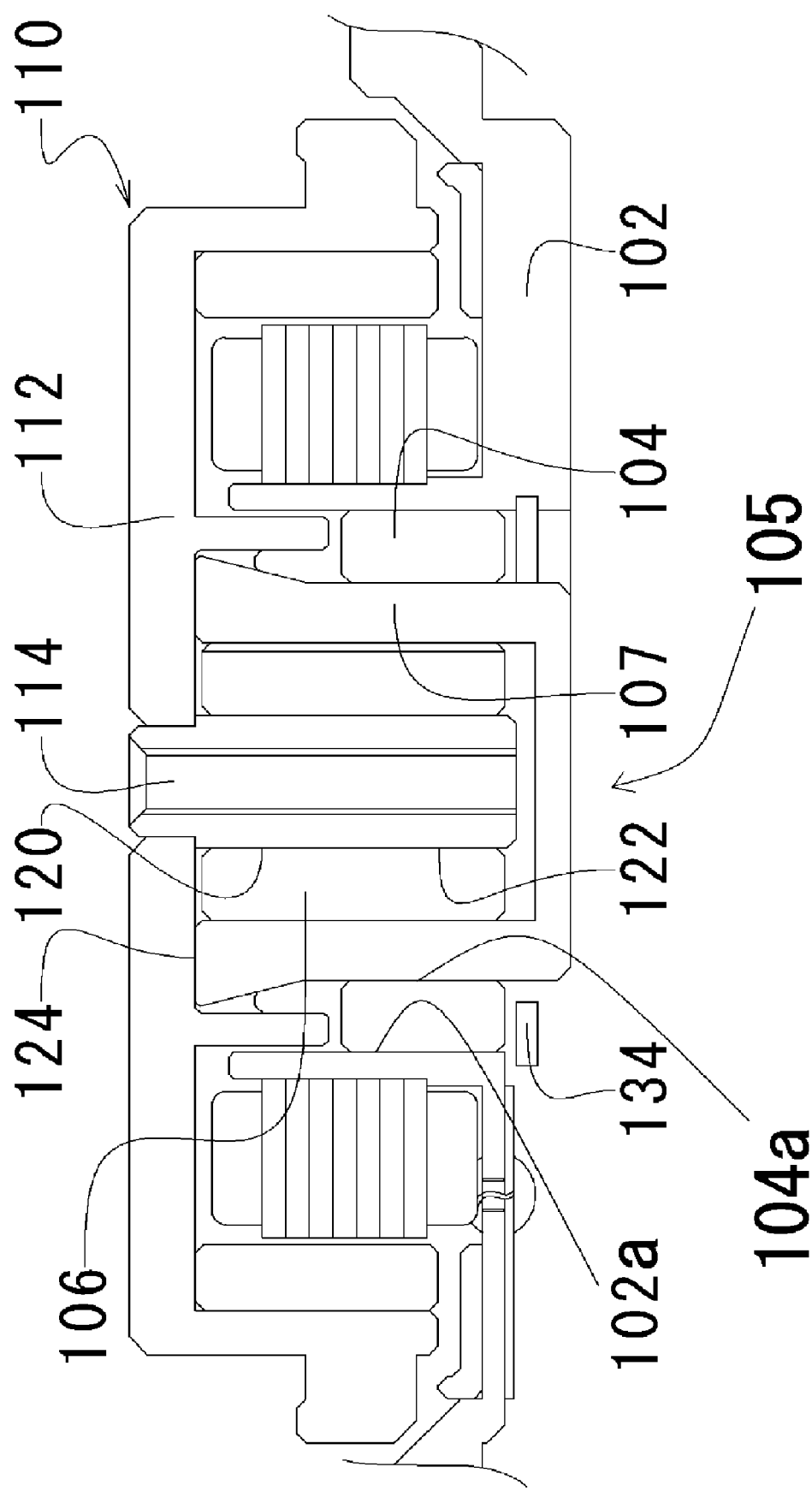
FIG. 6 is a vertical sectional view illustrating a spindle motor in Embodiment 2 of the present invention.

Referring now to FIG. 6, an explanation of Embodiment 2 of the present invention will be made. Here, inasmuch as the basic structure of the motor of this embodiment is equivalent to that of Embodiment 1 described above, correspondences are denoted with reference marks for the corresponding components being in the 100s, and detailed description will be made only of the portions that are different.

In the second embodiment, the motor is furnished with a bearing assembly 105 comprising a bearing housing 107, a sleeve 106, and a shaft 114.

The bearing housing 107 is anchored into a bushing through-hole 104a in a bushing 104, which is secured into a housing through-hole 102a in a bracket portion 102. The bearing housing 107 is a cuplike, close-ended cylindrical component, with the spiral grooves of FIG. 2 being formed in the top-edge surface of the bearing housing 107. A sleeve 106 is fixed along the inner circumferential surface of the bearing housing 107. The sleeve 106 is molded from a porous, oil-impregnated sintered compact, the substance of which is not particularly limited; a cast and sintered object, with various metal powders, metal-compound powders, and non-metal powders being the source material, can be used. Examples of the source material include Fe—Cu, Cu—Sn, Cu—Sn—Pb, and Fe—C. Therein, between the inner circumferential surface of the sleeve 106 and the outer circumferential surface of the shaft 114, upper and lower radial dynamic-pressure bearings 120 and 122 are formed; and between the top-edge surface of the bearing housing 107 and the undersurface of the rotor hub 112, a thrust dynamic-pressure bearing 124 is formed.

In the present embodiment, an electroconductive component 134 is fixed in between the bracket portion 102 and the bearing housing 107.

A motor in Embodiment 2 enables performance features and advantages similar to those of Embodiment 1 to be achieved. In addition, by the sleeve 106 being cast from a porous sintered substance, the spindle motor can be manufactured at low cost.

Embodiment 3

Figure 7:
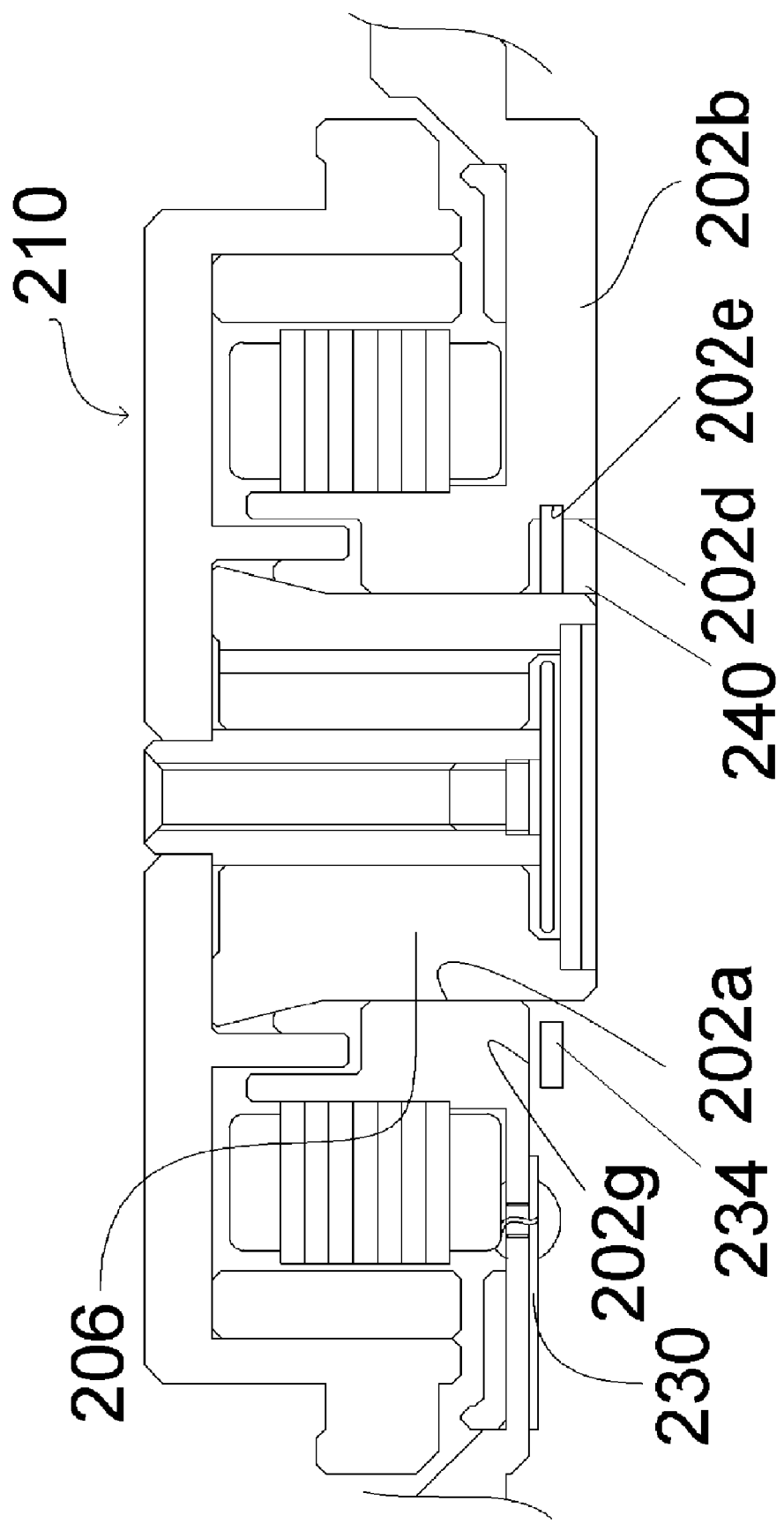
FIG. 7 is a vertical sectional view illustrating a spindle motor in Embodiment 3 of the present invention.

Referring next to FIG. 7, an explanation of Embodiment 3 of the present invention will be made. Here, inasmuch as the basic structure of the motor of this embodiment is equivalent to that of Embodiment 1 described above, correspondences are denoted with reference marks for the corresponding components being in the 200s, and detailed description will be made only of the portions that are different.

In Embodiment 3, a radially extending flat surface 202g is formed on the bottom portion of the bracket portion 202.

Further, a gap 240 is defined by the inner-edge surface 202d of a platform portion 202b that projects axially downward from the flat surface 202g, and the outer circumferential surface of the lower portion of the sleeve 206, which likewise projects axially downward from the flat surface 202g.

A circularly arcuate groove 202e is formed in the inner-edge surface 202d of the platform portion 202b, wherein an electroconductive component 234 is inset into the gap 240 by a method like that of Embodiment 1 described previously.

A motor in Embodiment 3 also enables performance features and advantages similar to those of Embodiment 1 to be achieved.

Embodiment 4

Figure 8:
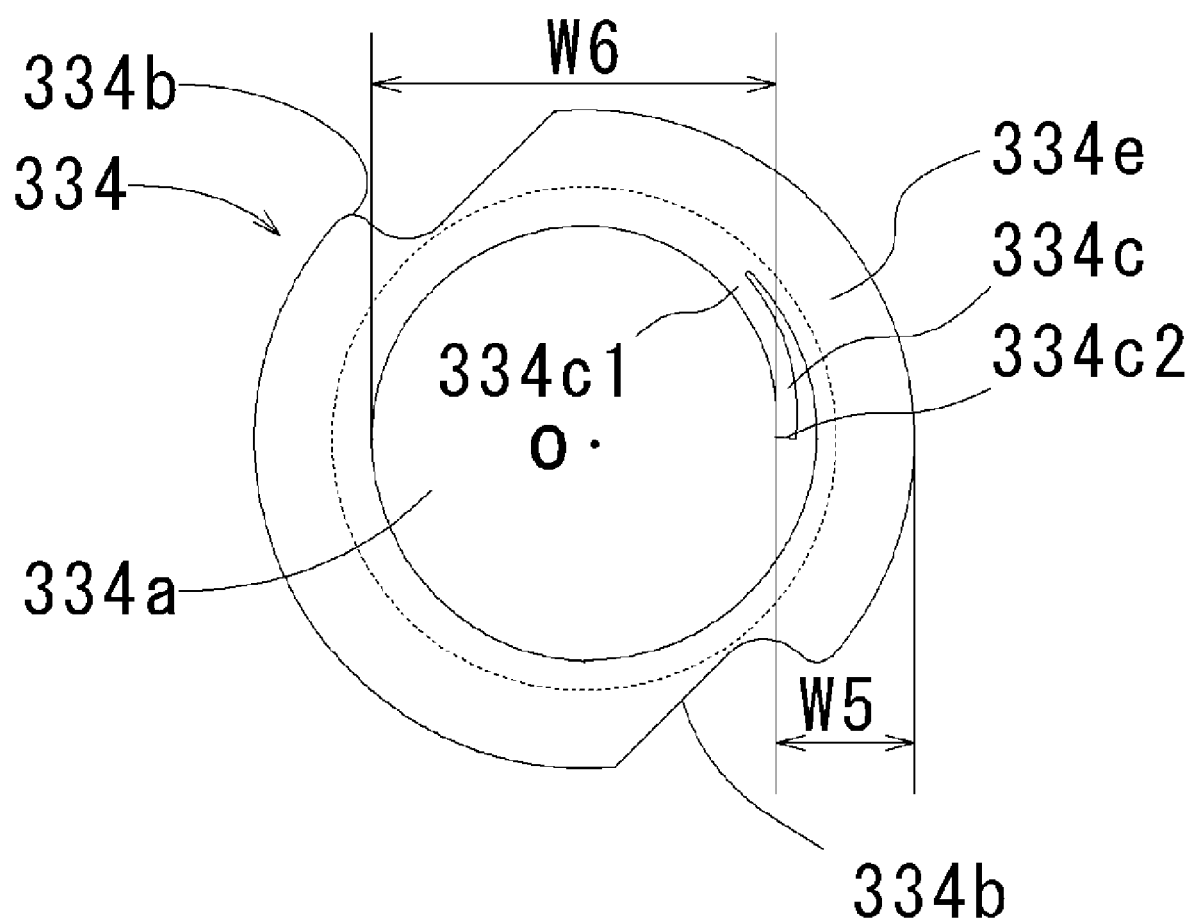
FIG. 8 is an overhead view of an electroconductive member in Embodiment 4 of the present invention.

Referring next to FIG. 8, an explanation of Embodiment 4 of the present invention will be made. An electroconductive component 334 in this embodiment is configured with: a hole 334a through the center portion; holds 334b, cut out from the outer circumferential surface to an inner circumferential surface of the electroconductive component 334; and an elastic limb 334c that is formed by slivering a portion of the electroconductive component 334.

The elastic limb 334c is of a form in which its width dimension gradually tapers running to the tip of the limb 334c. The electroconductive component 334 is therein formed so that the width dimension W5 from the innermost edge portion of the elastic limb 334c to the radially outward protruding portion 334e of the electroconductive component 334 where it radially opposes the elastic limb 334c will be longer than the radial width dimension W4, indicated in FIG. 1, from the inner-edge surface 2d of the platform portion 2b to the sleeve-projection outer circumferential surface 6d—that is, so that the relational formula W5>W4 holds. The electroconductive component 334 is at the same time configured so that the diameter W6 of the inner circumferential surface of the electroconductive component 334 where in contains the innermost edge portion of the elastic limb 334c will be equal to or longer than the diameter of the outer circumferential surface of the sleeve 6 in FIG. 1—that is, so that the relational formula W6≧W1 holds.

Electroconductive Component Functioning

Next, a method of fitting the electroconductive component 334 to the bracket portion 2 and sleeve 6 in FIG. 1 will be explained. At first, apart from the electroconductive component 334, the components that constitute the spindle motor are assembled. Next, a tool (not illustrated) is engaged in the holds 334b on the electroconductive component 334 to take hold of the electroconductive component 334. The electroconductive component 334 is then inserted into the gap 40. At this point, an outer peripheral portion 334e of the electroconductive component 334 is positioned on the edge of the circularly arcuate groove 2e where it opens on one of the end faces 2f of the platform portion 2b.

Figure 9:
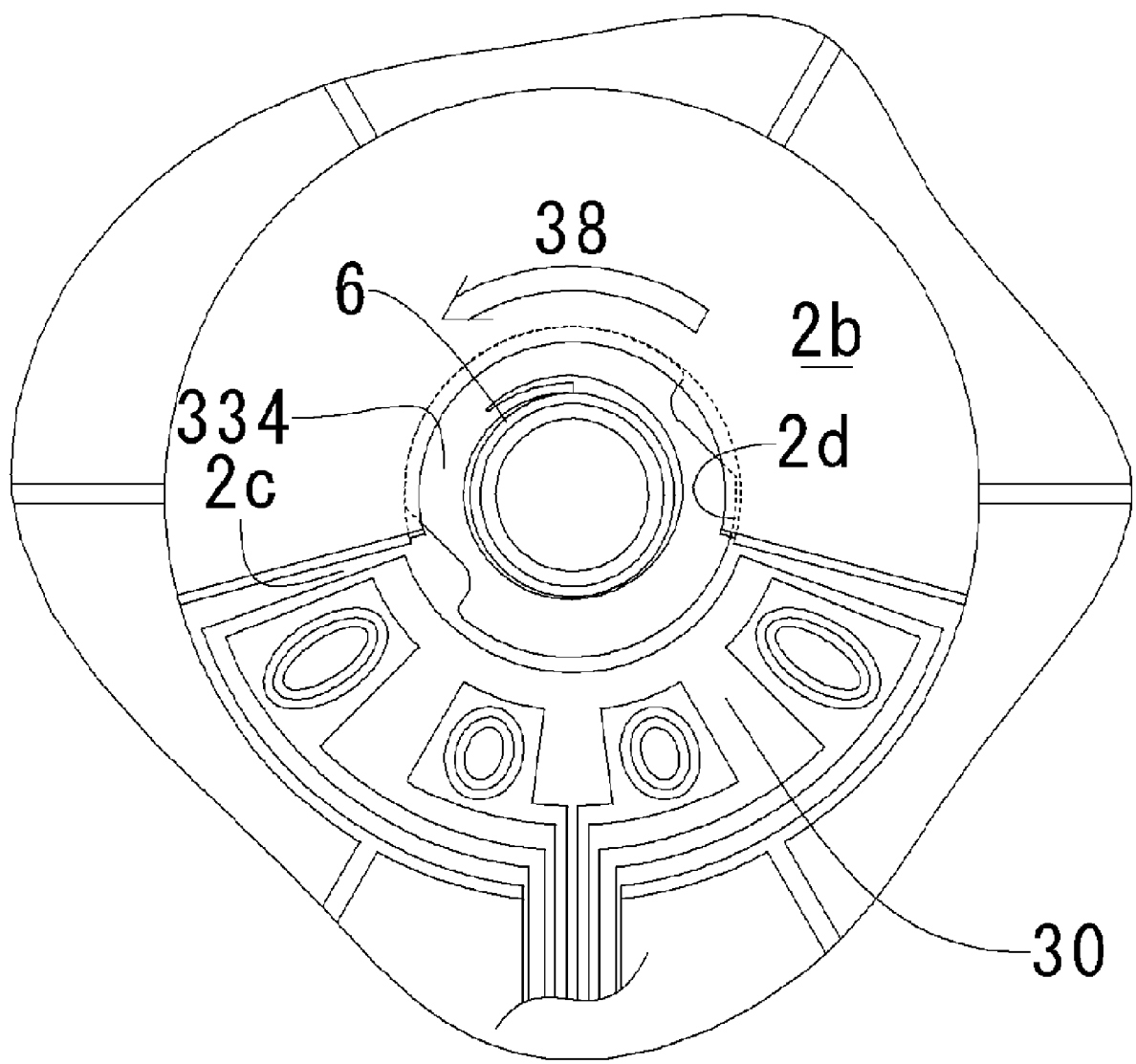
FIG. 9 is a view of the Embodiment 4 electroconductive member in the attached state.

The tool is then turned in the direction, as shown in FIG. 9, indicated by the arrow 38 (counterclockwise in the present embodiment), to inset the outer peripheral portion 334e into the arcuate groove 2e. At that point, the outer peripheral portion 334e, about to be inset into the arcuate groove 2e along its rim (not illustrated), is somewhat deformed radially inward (leftward in FIG. 8). This deformation firmly locks the elastic limb 334c against the sleeve-projection outer circumferential surface 6d. At the same time, the stress due to the elastic limb 334c locking against the sleeve-projection outer circumferential surface 6d is transmitted to the electroconductive component 334 via the basal portion 334c1 of the elastic limb 334c, urging the outer peripheral portion 334e radially outward (rightward in FIG. 8) and firmly locking it against the internal rim of the arcuate groove 2e. Accordingly, the electroconductive component 334 contacts on the sleeve 6 and bracket portion 2, maintaining elastic stress between them.

Static electricity that is generated by the recording disk(s) when the rotor assembly 10 is spinning is transmitted from the rotor assembly 10 to the sleeve 6 via the fluid dynamic-pressure bearings formed in between the sleeve 6 and the rotor assembly 10. The static electricity is then transmitted to the electroconductive component 334 via the region in which the elastic limb 334c of the electroconductive component 334 is locked against the sleeve-projection outer circumferential surface 6d, and is transmitted to the bracket portion 2 via the region in which the outer peripheral portion 334e of the electroconductive component 34 is locked against the internal rim of the arcuate groove 2e in the bracket portion 2. Electrical continuity between the sleeve 6 and the bracket portion 2 is favorably secured as a result, making it possible reliably to prevent the poor continuity that results from static electricity building up within the spindle motor.

It will be appreciated that the electroconductive component 334 fitted into a spindle motor of either Embodiment 2 or Embodiment 3 also enables performance features and advantages like those described above to be achieved.

Embodiment 5

Figure 10:
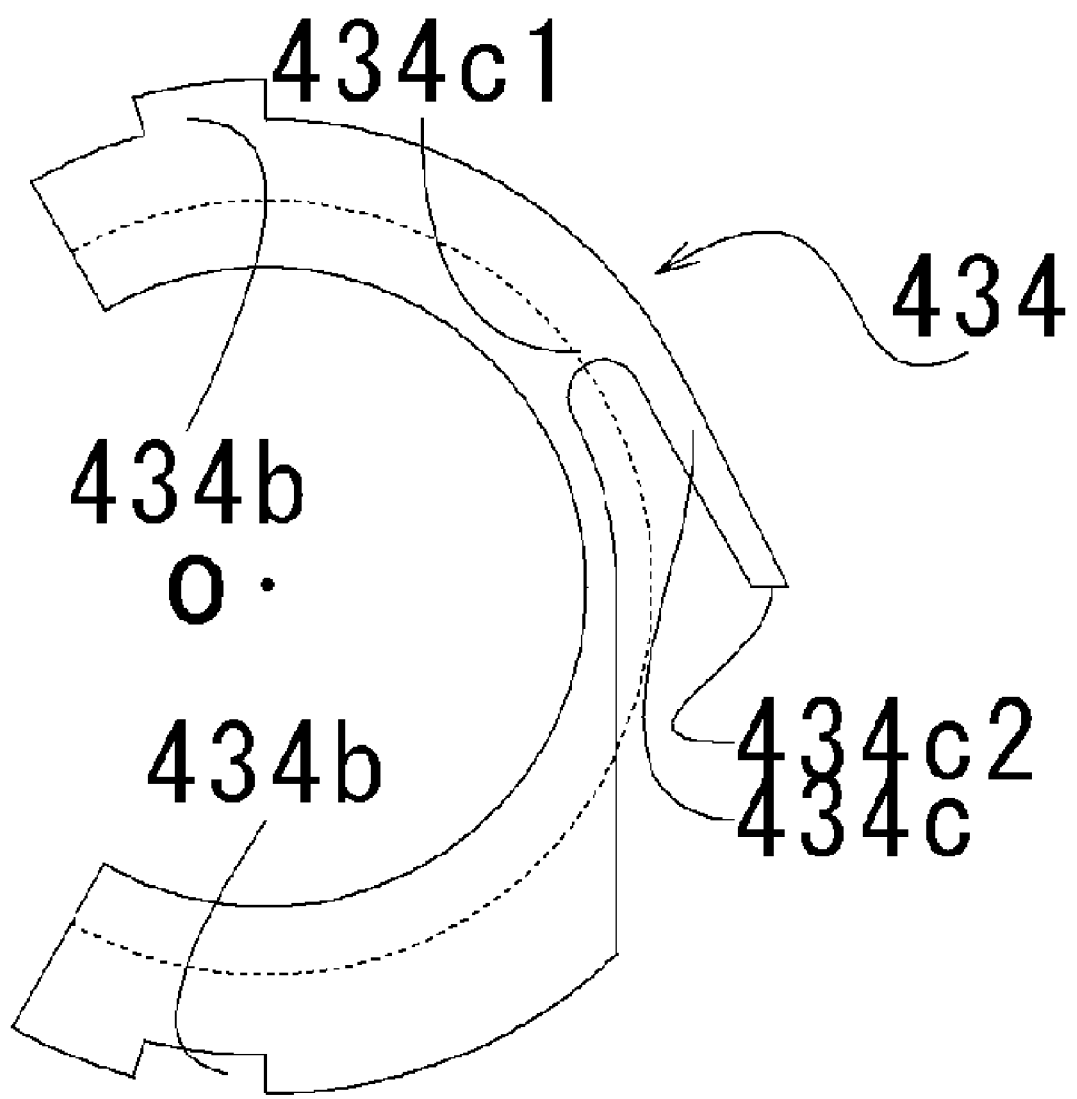
FIG. 10 is an overhead view of an electroconductive member in Embodiment 5 of the present invention.

Referring now to FIG. 10, an explanation of Embodiment 5 of the present invention will be made. An electroconductive component 434 in this embodiment is a roundly arcuate component, and is configured with: holds 434b that are taken hold of by a tool (not illustrated) in fitting the electroconductive component 434 to a spindle motor; and an elastic limb 434c formed by cutting out a portion of the electroconductive component 434.

An electroconductive member structured in this way, that is, as the electroconductive component 434, can also be fit into a spindle motor by a fitting method similar to that of Embodiment 1, and can secure favorable continuity between the sleeve and bracket portion. Moreover, the electroconductive component 43 can be fitted to the spindle motors of FIG. 1, FIG. 6, and FIG. 7.

Recording-Disk Drive

Figure 11:
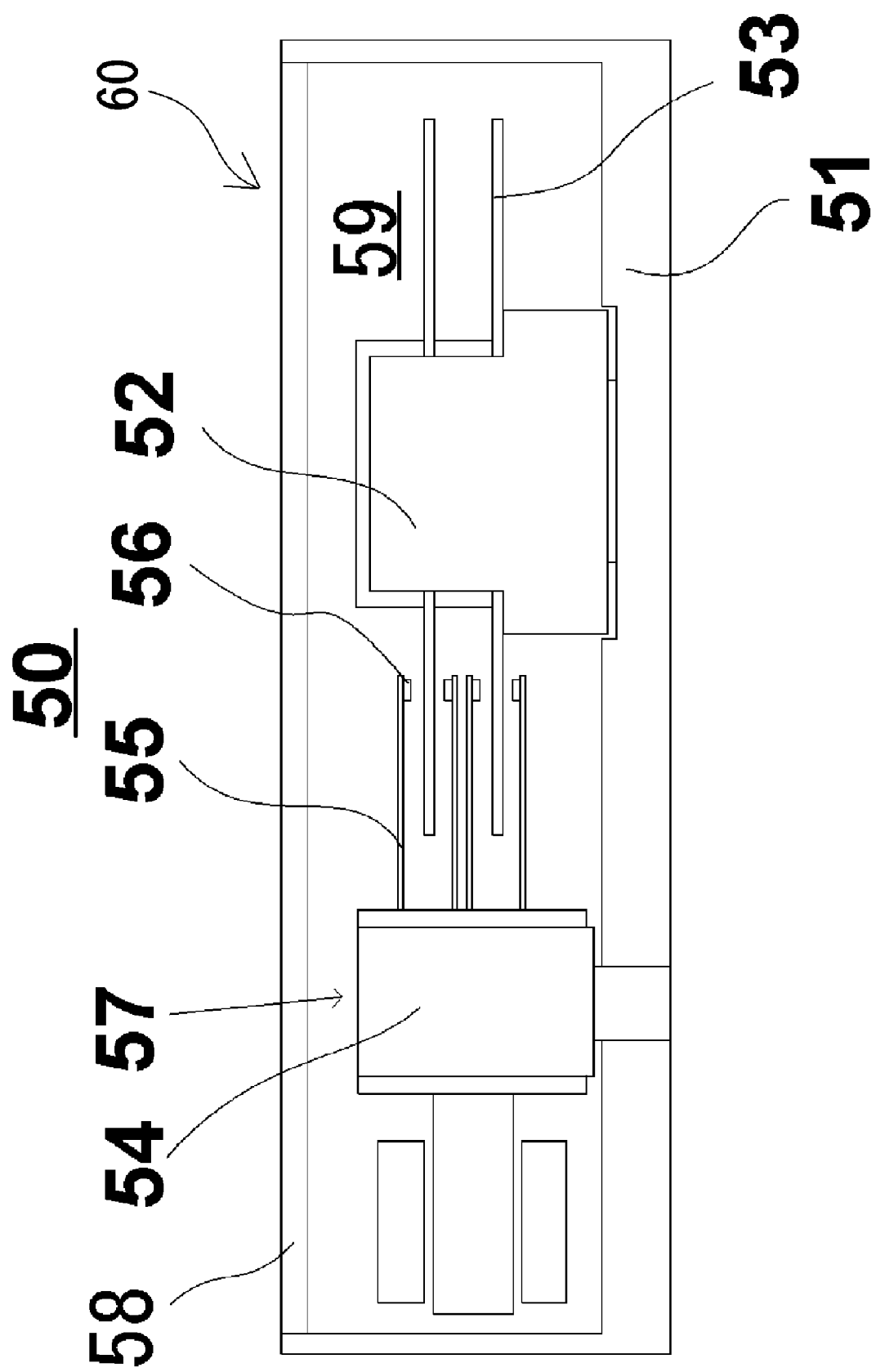
FIG. 11 is a vertical sectional view representing a recording-disk drive of the present invention.

Referring finally to FIG. 11, an explanation of the internal configuration of a recording-disk drive 50 will be made. A clean closed space 59 free of debris, dust, etc. is formed in a housing 60. The housing 60 includes the cuplike first housing member 51, and a caplike second housing member 58 for forming, together with the first housing member 51, the closed space 59 and thereby covering a mechanism 57 and a spindle motor 52 on which platter-shaped disks 53, such as hard disks, for recording information are fitted.

The mechanism 57 as disposed within the housing 60 is for shifting heads that read information from and write information onto the disks 53. The head-shifting mechanism 57 is constituted by: heads 56 that read/write information on the disks 53; arms 55 that support the heads 56; and an actuator 54 that shifts the arms 55 and heads 56 over the requisite locations on the disks 53.

Utilizing any of the spindle motors of FIGS. 1 through 11 as the spindle motor 52 for the recording-disk drive 50 as such enables the spindle motor to be at all times stably rid to the motor exterior of static electricity, regardless of the temperature environment under which the recording-disk drive is employed. Accordingly, recording-disk drives of superior reliability and durability can be made available.

Although in the foregoing explanation has been made of single embodiments, in accordance with the present invention, of a spindle motor, and a recording-disk drive furnished with the spindle motor, the present invention is not limited to the given embodiments; various alterations and modifications are possible without departing from the scope of the present invention.

For example, in the present embodiments, oil is employed as the fluid in the fluid dynamic-pressure bearings, but utilizing a motor that employs so-called aerodynamic bearings, in which air is made the fluid, can also yield the same performance features and advantages of the present invention as heretofore described.

Another example is that in the present embodiments, motors of the outer-rotor type in which the stator is furnished radially inside the rotor magnet were utilized, but the present invention is not thereby limited, in that it is applicable to so-called inner-rotor motors, in which the stator is furnished radially outside the rotor magnet.

Furthermore, the housing member that forms a structural component of a motor involving an embodiment of the present invention need only be at least a part of the motor housing as a whole, and may be a part of the motor housing other than the above-described first housing member. For example, the motor-structuring housing member may be the above-described second housing member, or may be a part of such a housing member. In addition, the motor-structuring housing member may be formed integrally in a single piece constituting the motor housing as a whole.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

What is claimed is:

1. A spindle motor including a stator and a rotor and comprising:

an assembly including a sleeve and a shaft inserted in the sleeve, one of the sleeve and the shaft being supported in the assembly so as to be rotatable about an axis relative to the other of the sleeve and the shaft, the stator of the motor including the other of the sleeve and the shaft;

a bracket having a through-hole which extends along the axis and receives the assembly therein with a portion of the assembly constituting the stator of the motor being fixed relative to the bracket; and an electroconductive member disposed between said portion of the assembly constituting the stator of the motor and the bracket and having an elastic part which is elastically deformable on at least one of an inner circumference and an outer circumference thereof in a radial direction perpendicular to the axis; wherein the elastic part is in contact with at least one of the bracket and said portion of the assembly while being elastically deformed, and the electroconductive member is in contact with both said portion of the assembly and the bracket by a spring force of the elastic part elastically deformed, to electrically connect the bracket and said portion of the assembly to each other.

2. A spindle motor according to claim 1, wherein the assembly further includes a bushing having an axially extending hollow therein and arranged in the through-hole of the bracket; wherein the bushing is disposed between the sleeve and the bracket.

3. A spindle motor according to claim 1, wherein:
the bracket has a radially extending flat surface at its one axial end and a platform portion axially projecting from the flat surface;
the assembly axially projects from the flat surface of the bracket, an outer surface of a projecting portion of the assembly facing an inner surface of the platform portion in the radial direction; and
the electroconductive member is disposed between the outer surface of the projecting portion of the assembly and the inner surface of the platform portion with the elastic part elastically engaging with at least one of the outer surface of the projecting portion of the assembly and the inner surface of the platform portion.

4. A spindle motor according to claim 3, wherein the sleeve axially projects from the flat surface of the bracket, an outer surface of a projecting portion of the sleeve facing the inner surface of the platform portion of the bracket.

5. A spindle motor according to claim 3, wherein a groove is formed on the inner surface of the platform portion, with which the elastic part of the electroconductive member is to engage.

6. A spindle motor according to claim 5, wherein:
the platform portion has end faces at circumferential ends; and
the groove is open at the end faces.

7. A spindle motor according to claim 6, wherein the elastic part is a protruding portion of the electroconductive member which has a radial width tapering down toward one of two directions of rotation around the axis.

8. A spindle motor according to claim 6, wherein the electroconductive member is rotated about the axis to make the elastic part enter the groove from one of the end faces of the platform portion.

9. A spindle motor according to claim 1, wherein the elastic part is a protruding portion of the electroconductive member, a radial width of the protruding portion tapering down toward its tip.

10. A spindle motor according to claim 9, wherein the protruding portion as the elastic part protrudes from the outer circumference of the electroconductive member.

11. A spindle motor according to claim 9, wherein the protruding portion as the elastic part protrudes from the inner circumference of the electroconductive member.

12. A spindle motor according to claim 1, wherein:
said portion of the assembly constituting the stator of the motor further includes a bearing housing disposed between the sleeve and the bracket; and
the electroconductive member is fixed between the bracket and the bearing housing.

13. A spindle motor according to claim 1, wherein the bracket includes a platform portion having a flat surface, the sleeve is fixed relative to the bracket and the shaft is supported in the assembly so as to be rotatable relative to the sleeve whereby the rotor of the motor includes the shaft, and wherein the spindle motor further comprises:
coils of the stator disposed on the bracket;
a rotor magnet of the rotor radially facing the stator; and
a circuit board disposed on the flat surface of the platform portion of the bracket and electrically connected to the coils of the stator.

14. A disk drive for use with a disk capable of storing information, comprising:
the spindle motor according to claim 1 operable to rotate the disk;
an accessing unit operable to carry out at least one of writing information on and reading information from the disk; and
a housing forming a closed space in which the spindle motor and the accessing unit are accommodated.

15. A disk drive according to claim 14, wherein the bracket of the spindle motor forms a portion of the housing.

16. A spindle motor according to claim 1, wherein the electroconductive member is in contact with both the sleeve and the bracket.

* * * * *